US006765764B1

(12) United States Patent
Misso et al.

(10) Patent No.: US 6,765,764 B1
(45) Date of Patent: Jul. 20, 2004

(54) E-BLOCK WITH STAMPED AND DRAWN ACTUATOR ARM MEMBERS

(75) Inventors: Nigel F. Misso, Bethany, OK (US); Eldon L. Nelson, Oklahoma City, OK (US); Anthony E. Martin, Mustang, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 69 days.

(21) Appl. No.: 09/697,957

(22) Filed: Oct. 27, 2000

Related U.S. Application Data
(60) Provisional application No. 60/180,261, filed on Feb. 4, 2000.

(51) Int. Cl.[7] .............................. G11B 5/49; G11B 21/16
(52) U.S. Cl. ................................ 360/266.1; 360/265.7; 360/265.8; 360/266; 29/603.03
(58) Field of Search ........................... 360/266.1, 265.8, 360/265.7, 266; 29/603.03

(56) References Cited

U.S. PATENT DOCUMENTS

| 5,122,703 A | | 6/1992 | Takahashi et al. | |
|---|---|---|---|---|
| 5,382,851 A | | 1/1995 | Loubier | |
| 5,528,091 A | | 6/1996 | Loubier et al. | |
| 5,557,839 A | * | 9/1996 | Mastache et al. | 29/603.03 |
| 5,621,590 A | | 4/1997 | Pace et al. | |
| 5,650,896 A | | 7/1997 | Viskochil | |
| 5,654,849 A | | 8/1997 | Hassibi et al. | |
| 5,656,877 A | | 8/1997 | Loubier | |
| 5,677,815 A | | 10/1997 | Chan | |
| 5,717,549 A | * | 2/1998 | Jurgenson | 360/266.1 |
| 5,844,754 A | | 12/1998 | Stefansky et al. | |
| 5,936,808 A | | 8/1999 | Huang et al. | |
| 5,986,852 A | * | 11/1999 | Berg et al. | 360/266.1 |
| 5,999,372 A | | 12/1999 | Peterson et al. | |
| 5,999,373 A | | 12/1999 | Allsup et al. | |
| 6,226,157 B1 | * | 5/2001 | Kim | 360/266.1 |

\* cited by examiner

*Primary Examiner*—Craig A. Renner
(74) *Attorney, Agent, or Firm*—Fellers, Snider, et al.

(57) ABSTRACT

An E-block of an actuator for use in a data handling system to support a read/write head adjacent a recording surface. The E-block is formed by providing feed stock along a planar orientation, drawing a portion of the feed stock out of plane to form an extension portion, and stamping the feed stock to separate an actuator arm member having a substantially planar actuator arm from which the extension portion extends, the actuator arm configured to support the read/write head. A planar motor support member configured to support a coil of an actuator motor is also stamped from the feed stock. The actuator arm member and the motor support member are stacked and attached using a suitable process such as swaging or welding. The extension portion of the actuator arm member establishes a desired axial separation distance between the motor support member and the actuator arm.

19 Claims, 7 Drawing Sheets

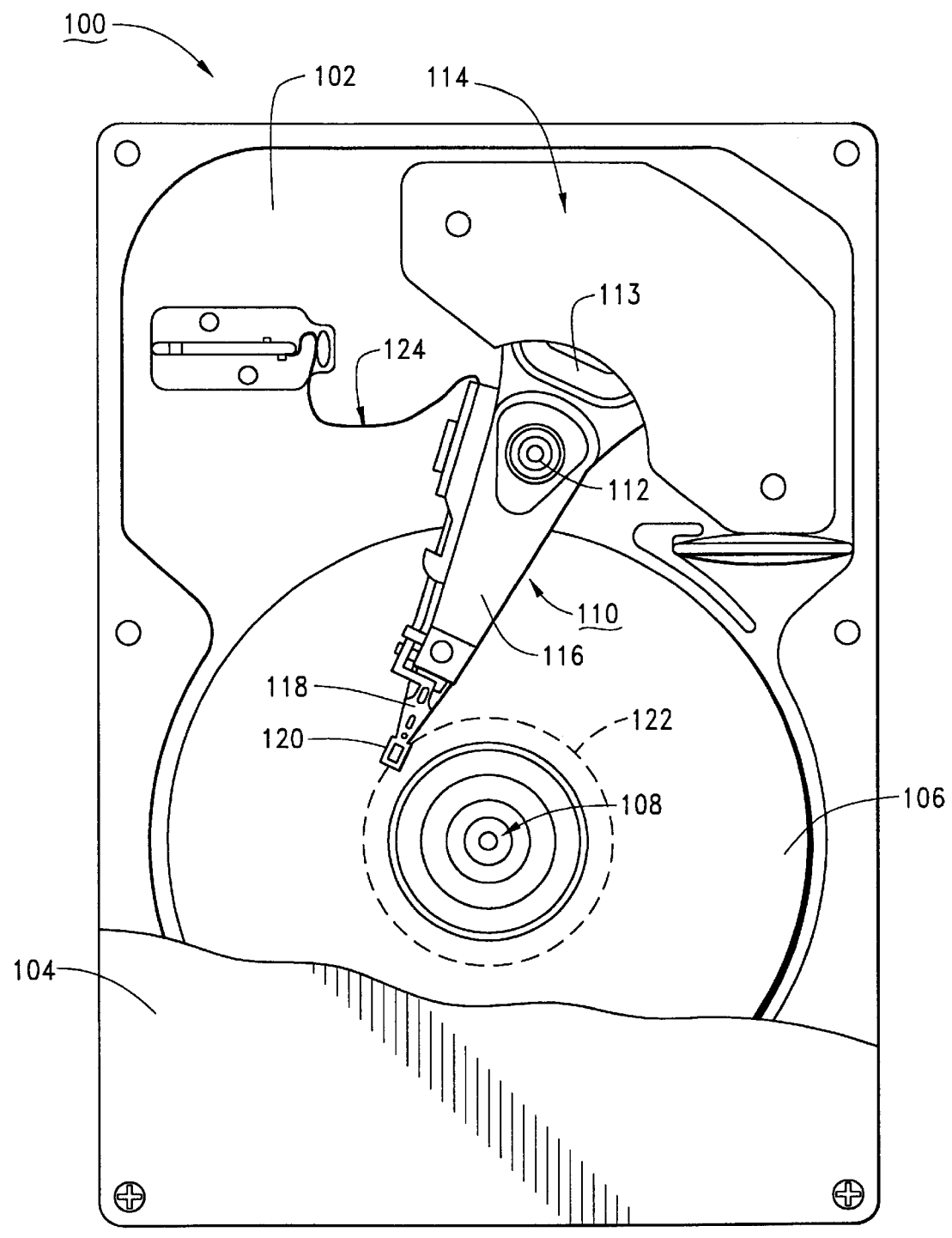

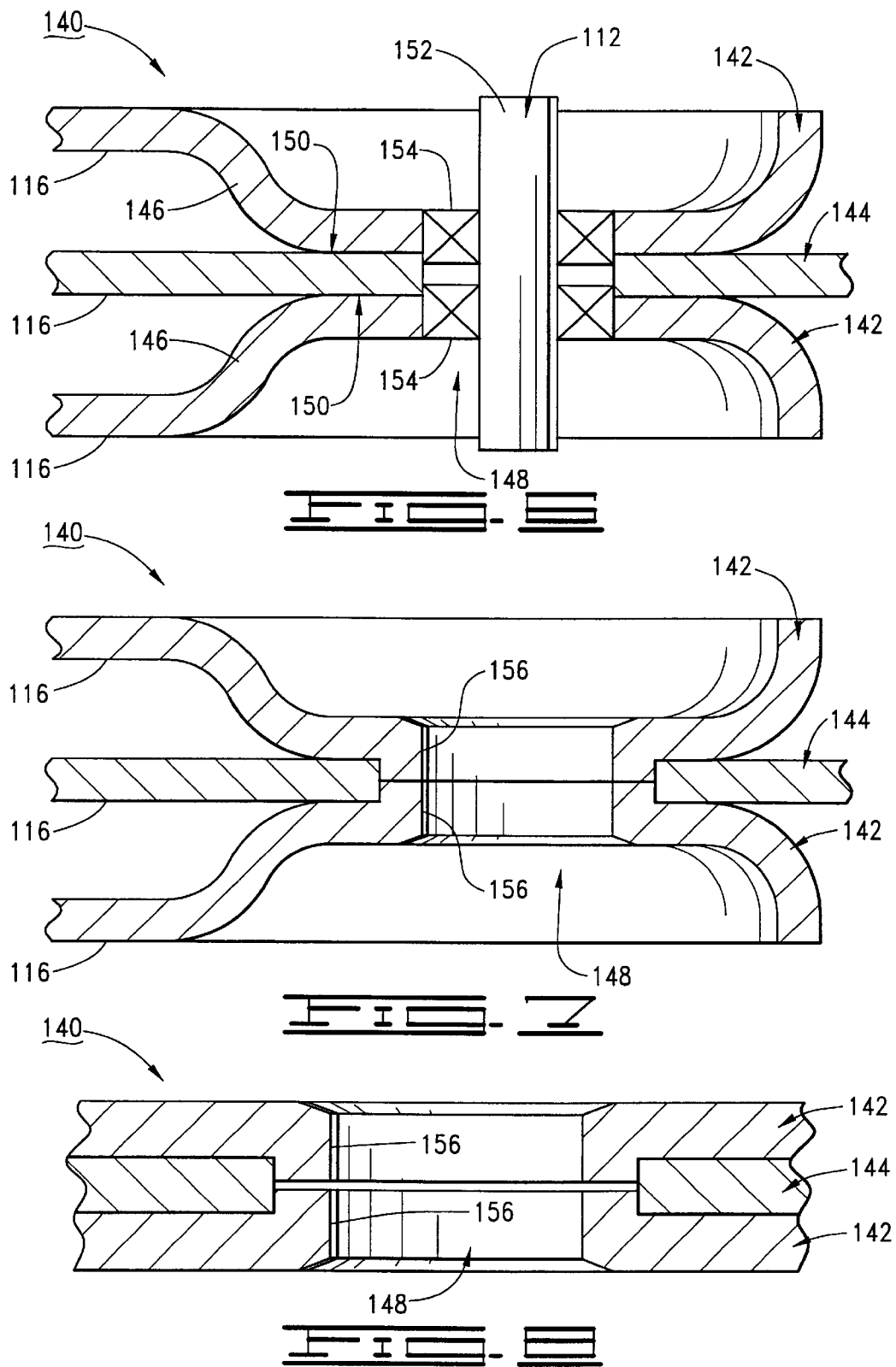

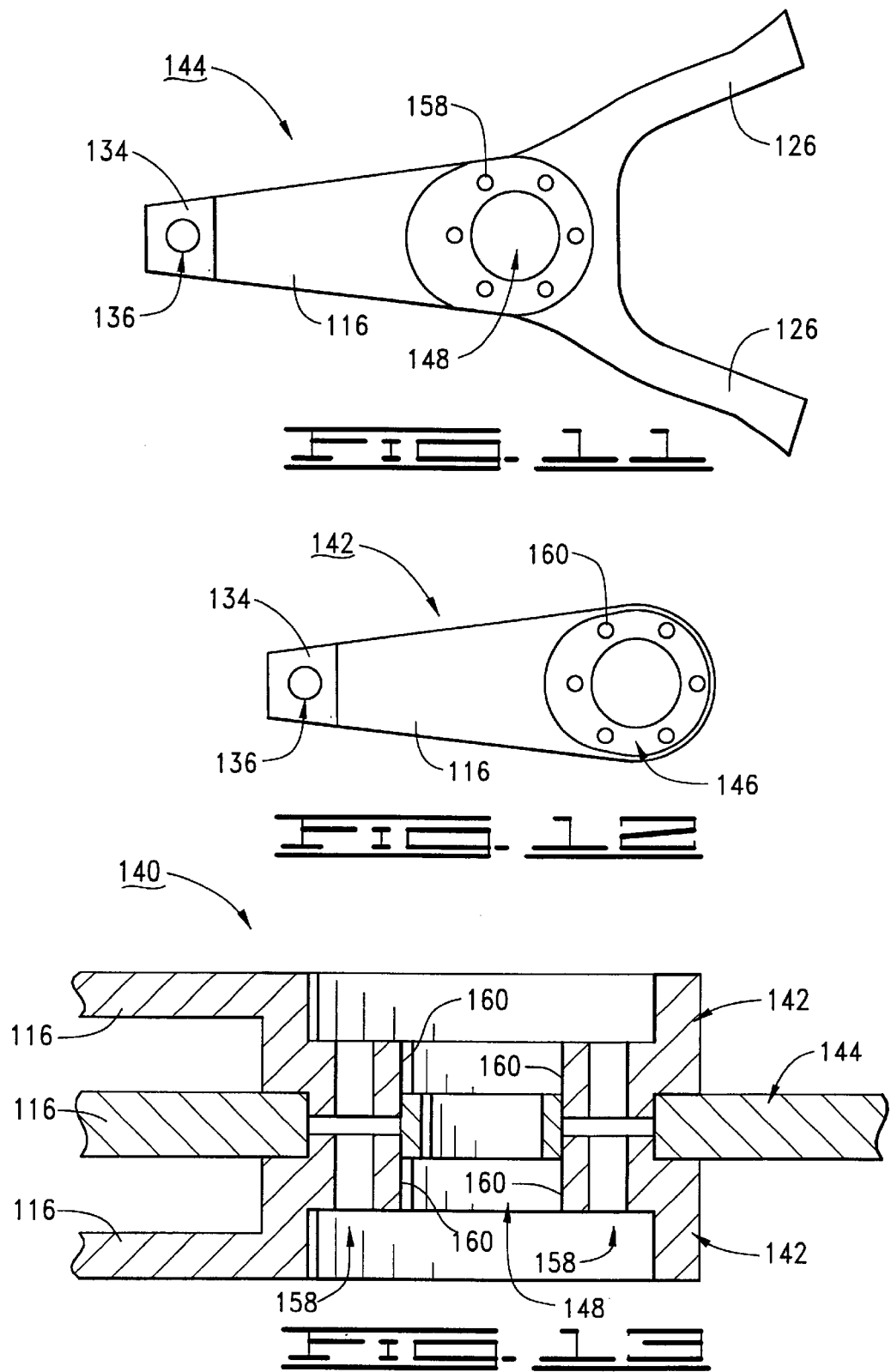

E-BLOCK WITH STAMPED AND DRAWN ACTUATOR ARM MEMBERS

RELATED APPLICATIONS

This application claims priority to U.S. Provisional Application No. 60/180,261 filed Feb. 4, 2000.

FIELD OF THE INVENTION

This invention relates generally to the field of magnetic data storage devices, and more particularly, but not by way of limitation, to an improved E-block formed from stamped and drawn actuator arms, the E-block used to support one or more read/write heads adjacent a corresponding number of disc recording surfaces.

BACKGROUND

Disc drives are data handling systems used to provide primary data storage operations in modern computer systems and networks. A typical disc drive comprises a head-disc assembly (HDA) which houses mechanical portions of the drive, and a printed circuit board assembly (PCBA) mounted to an outer surface of the HDA which supports electronic circuitry used to control the HDA.

Typically, a HDA comprises a number of magnetic discs affixed to, and rotated by, a spindle motor at a constant high speed. An actuator supports an array of read/write heads adjacent the disc surfaces. The surface of each disc is a data recording surface divided into a series of generally concentric recording tracks radially spaced across a band having an inner diameter and an outer diameter. The data tracks extend around the surfaces of the discs and data are stored to the tracks by the heads in the form of magnetic flux transitions. Typically, each data track is divided into a number of data sectors that store fixed sized data blocks.

An actuator motor, such as a voice coil motor (VCM), rotates the actuator, and hence the heads, across the disc surfaces. The control circuitry on the PCBA includes a read/write channel which interfaces with the heads to transfer data between the tracks and a host computer, and a servo control system which drives the VCM to provide head positional control, based on servo data stored in servo fields interspersed among the data sectors and written during disc drive manufacturing.

Continued demand for disc drives with ever increasing levels of data storage capacity and data throughput have led disc drive manufacturers to seek ways to increase the storage capacity of each disc surface and improve operating efficiencies of the disc drive. Coupled with the continued demand for high-performance, high-capacity disc drives is the continued erosion in the price per megabyte of storage capacity disc drive manufacturers are able to receive from the market for their products. To remain viable, disc drive manufacturers are under continual pressure to reduce the cost per megabyte associated with the manufacture and marketing of their product offerings.

One area for opportunity is the actuator used within the disc drive. The industry has substantially settled on a design featuring a flat coil rotary actuator with a body portion rotatable about a bearing assembly and actuator arms which project from the body portion toward the discs. This portion of the actuator is sometimes referred to as an "E-block" or "actuator core." Typical methodologies for forming E-blocks have included casting or extruding a solid form with overall dimensions corresponding to the desired E-block volume followed with extensive secondary machining operations to form the actuator arms and the coil support arms; by stacking planar actuator arms with interleaved spacers and securing the assembly with threaded hardware; and by forming planar actuator arms and overmolding with a suitable material to arrive at the final configuration.

While these and other prior art approaches have been found operable. demands to produce consistent and repeatable results, particularly from the performance contributions from the E-block, have increased the amount of time required to establish critical surfaces of the E-block, burdening the actuator with increased cost pressures. Thus, there remains a continued need for improved approaches to forming an actuator E-block with tightly controlled tolerances in a fast and cost efficient manner, and it is to such improvements that the present invention is directed.

SUMMARY OF THE INVENTION

The present invention is directed to an improved E-block used in a data handling system such as a disc drive to support one or more read/write heads adjacent a corresponding number of axially aligned recording surfaces.

In accordance with preferred embodiments, the E-block is formed by providing feed stock of a suitable material, such as aluminum, and orienting the feed stock along a planar orientation. A portion of the feed stock is drawn out of plane to form an extension portion. The feed stock is stamped (blanked, cut) to separate an actuator arm member having a substantially planar actuator arm from which the extension portion extends, the actuator arm configured to support at least one read/write head. The extension portion of the actuator arm member is affixed to a second member using a suitable process such as swaging or welding.

The second member preferably comprises a motor support member having a coil support arm configured to support an actuator coil of an actuator motor. The second member is also preferably stamped from the feed stock. The motor support member also preferably comprises an actuator arm, so that the extension portion of the actuator arm member nominally establishes the distance between the adjacent actuator arms so that the arms can be nested adjacent opposing sides of a recording disc.

The E-block can further be configured to comprise a second actuator arm member nominally identical to the first actuator arm member. The first and second actuator arms can be stacked together, or affixed to opposing sides of the motor support member to form the E-block. Suitable coining operations are performed to establish critical dimensions to ensure repeatability and reliability.

These and various other features and advantages which characterize the present invention will be apparent from a reading of the following detailed description and a review of the associated drawings.

BRIEF DESCRIPTION OF THE DRAWINGS

FIG. 1 is a top plan view of a disc drive data handling system constructed in accordance with preferred embodiments of the present invention.

FIG. 6 provides an elevational cross-sectional view of the E-block of FIGS. 3–5, showing attachment of the respective actuator arm members to the motor support member using a welding process in accordance with preferred embodiments.

FIG. 7 provides an elevational cross-sectional view of the E-block of FIGS. 3–5, showing attachment of the respective actuator arm members to the motor support member using a swage connection in accordance with preferred embodiments.

FIG. 8 shows the swage connection of FIG. 7 in greater detail.

FIGS. 11–13 provide respective views of yet another E-block embodiment which uses radially spaced swage bosses and apertures to secure the actuator arm members to the motor support member.

DETAILED DESCRIPTION

Figure 2:
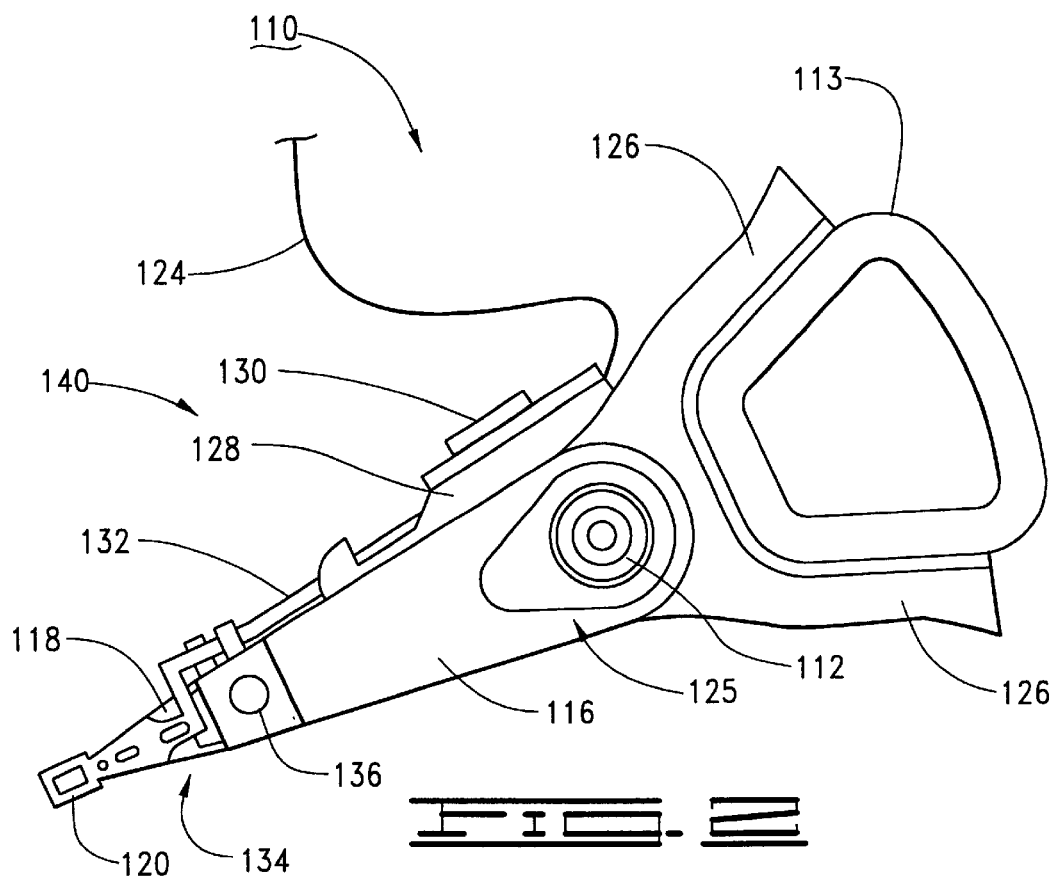
FIG. 2 is a plan view of an actuator of the disc drive of FIG. 1.

Referring to the drawings in general, and more particularly to FIG. 1. shown therein is a top view of a data handling system 100 (hereinafter "disc drive") constructed in accordance with preferred embodiments of the present invention. It will be noted that numerous details of and variations for the construction of the disc drive 100 are not included in the following description as such are well known to those skilled in the art and are believed to be unnecessary for the purpose of presenting the various embodiments of the invention.

The disc drive 100 includes a basedeck 102 that supports various mechanical components of the disc drive 100. A top cover 104 (shown in partial cut-away fashion) cooperates with the basedeck 102 to form an internal housing for the disc drive 100.

A number of recording discs 106 are rotated by a spindle motor 108 and accessed by an actuator 110 formed in accordance with preferred embodiments. The actuator 110 rotates about a pivot bearing assembly 112 in response to the application of current to a coil 113 (partially shown) of a voice coil motor (VCM) 114. The actuator 110 further includes a plurality of rigid actuator arms 116 which support flexible suspension assemblies 118 (also referred to as "flexures" and "load arms"). At the distal end of each flexure is a read/write head 120 which magnetically interacts with the corresponding disc surface to write and read data to tracks (not shown) defined on the disc surfaces.

The heads 120 are brought to rest on texturized landing zones 122 and the actuator is secured by a conventional latch arrangement (not shown) when the disc drive is deactivated. A flex circuit assembly 124 provides electrical communication paths between the actuator 110 and a disc drive printed circuit board assembly (PCBA, not shown) mounted to the underside of the base deck 102.

The manner in which the actuator 110 is formed in accordance with various preferred embodiments will now be discussed after a brief review of the basic construction of the actuator 110, a more detailed representation of which is provided in FIG. 2. As shown in FIG. 2, the actuator 110 includes an actuator body portion 125 configured to support and pivot about the pivot bearing assembly 112. A pair of coil support arms 126 project from the actuator to support the actuator coil 113. A flex support 128 of the flex circuit assembly 124 is mounted to the side of the actuator 110 to support a preamplifier driver 130 and to route flex conductors 132 to the heads 120. The flexures 118 are affixed to load arm attachment surfaces (denoted generally at 134) located at the distal ends of the actuator arms 116 in a suitable manner, such as swage connections using load arm apertures 136.

Figure 3:
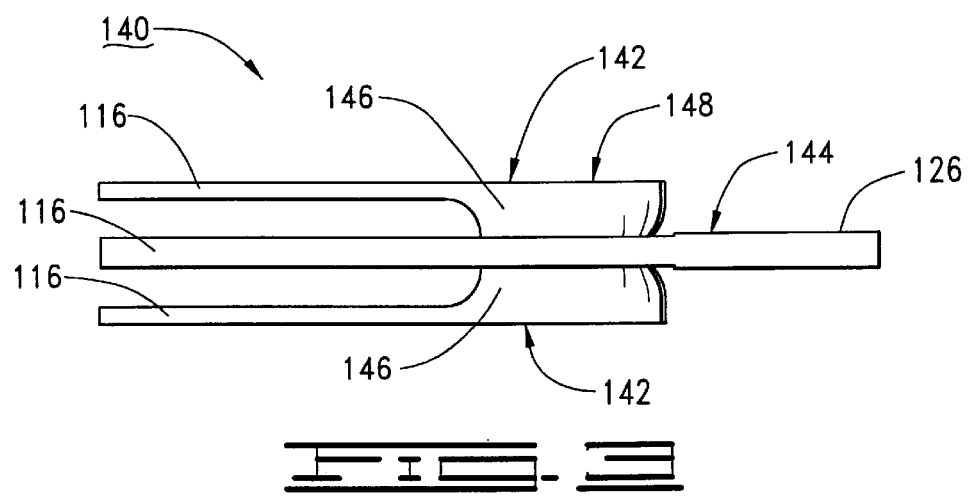
FIG. 3 is an elevational view of an E-block of the actuator in accordance with preferred embodiments, the E-block substantially comprising the main structural components, or core, of the actuator of FIG. 2 including a pair of oppositely disposed actuator arm members and a central motor support member.
Figure 4:
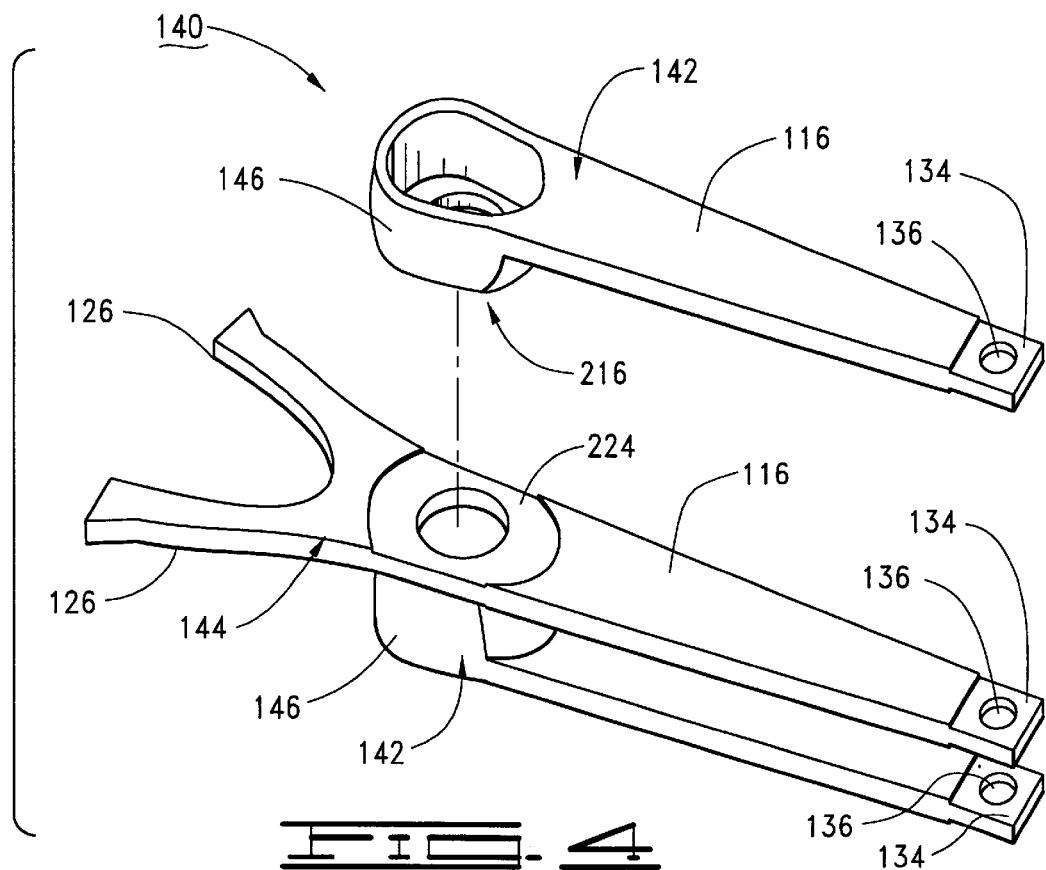
FIG. 4 is an isometric, partially exploded view of the E-block of FIG. 3.
Figure 5:
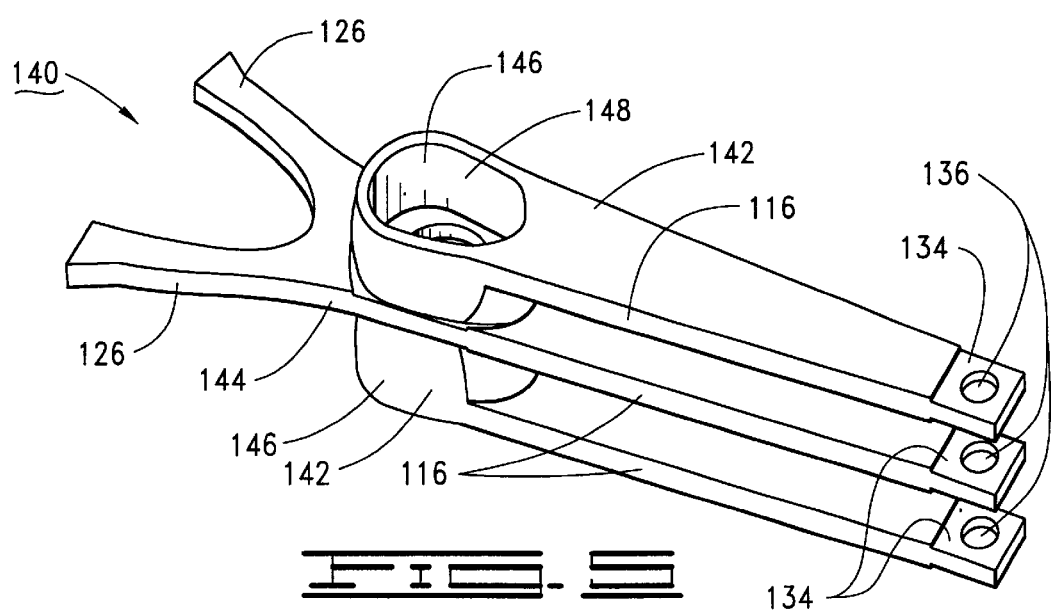
FIG. 5 is an isometric view of the assembled E-block of FIG. 3.

Collectively, the rigid mechanical portions of the actuator including, the arms 116, body portion 125 and coil support arms 126 generally compose an E-block 140 (also referred to as an "actuator core"). Detailed views of the E-block 140 are shown in FIGS. 3–5. It will be noted that the embodiment of FIGS. 3–5 is configured to support heads 120 adjacent two discs 106, but such is not necessarily limiting to the claimed invention. For simplicity of discussion, the same reference numerals will be used to identify various alternative configurations for the main E-block components.

The E-block 140 generally comprises actuator arm members 142 which matingly engage a planar, central motor support member 144. The actuator arm members 142 each comprise a planar actuator arm 116 and an extension portion 146 which is drawn from the actuator arm 116 and configured as described below to mate with a corresponding surface of the motor support member 144. The motor support member 144 includes the coil support arms 126 (also shown in FIG. 3) and, in the embodiment of FIGS. 3–5, further includes another one of the actuator arms 116. It will be noted that the extension portions 146 of the actuator arm members 144 and central portions of the motor support member 142 generally compose the actuator body 125 referenced in FIG. 2.

The various geometries of the E-block 140 are selected to provide appropriate clearance and stiffness to support the flexures 118 and heads 120, and stiffening features (such as bends or ridges, not separately shown) along various axes can be readily incorporated into the actuator arms 116 as desired. Although it is contemplated that the E-block 140 can be configured to have a substantially reduced mass as compared to prior art actuators, mass reducing techniques, such as the incorporation of lightening holes through the actuator arms 116, can also be utilized as desired. Each of the actuator arm members 142 and the motor support member 144 further include central apertures (not individually numerically designated) which, when the E-block 140 is assembled, align to form a pivot bearing assembly aperture 148 sized to accommodate the pivot bearing assembly 112.

FIG. 6 provides an elevational cross-sectional view of the E-block of 140 in accordance with a preferred embodiment in which the actuator arm members 142 are attached to the motor support member 144 using a welding process, such as laser weld or electron-beam weld, at boundaries 150. FIG. 6 also shows a preferred construction for the pivot bearing assembly 112, which comprises a stationary shaft 152 and a pair of bearing assemblies 154 pressed about the shaft 152 within the pivot bearing assembly aperture 148. Other configurations for the pivot bearing, assembly 112 are readily configured, however, such as the use of a cartridge bearing assembly arrangement (not shown) in which an outer cylindrical sleeve is interposed between the bearing assemblies 154 and the inner wall of the pivot bearing assembly aperture 148. This latter configuration will generally accommodate a greater axial distance between the bearing assemblies 154. In another embodiment, the extension portion 146 of the actuator arm members 142 can be configured to support the bearing assemblies 154 at locations closer to the respective axial ends of the shaft 152. These and other configurations can be readily implemented by those having skill in the art depending upon the requirements of a given application.

FIG. 7 provides another elevational cross-sectional view of the E-block 140 in accordance with an alternative embodiment in which a swage connection is formed between the actuator arm members 142 and the motor support member 144. More particularly, the actuator arm members 142 are each provided with a swage boss 156 sized to fit in close proximity to the central aperture of the motor support member 144. A swage tool, such as a ball (not shown), is thereafter passed through the pivot bearing assembly aperture 148 to deform the swage bosses 156 radially outwardly to form an interference fit with the motor support member 144. FIG. 8 illustrates the final swage connection in greater detail.

Figure 9:
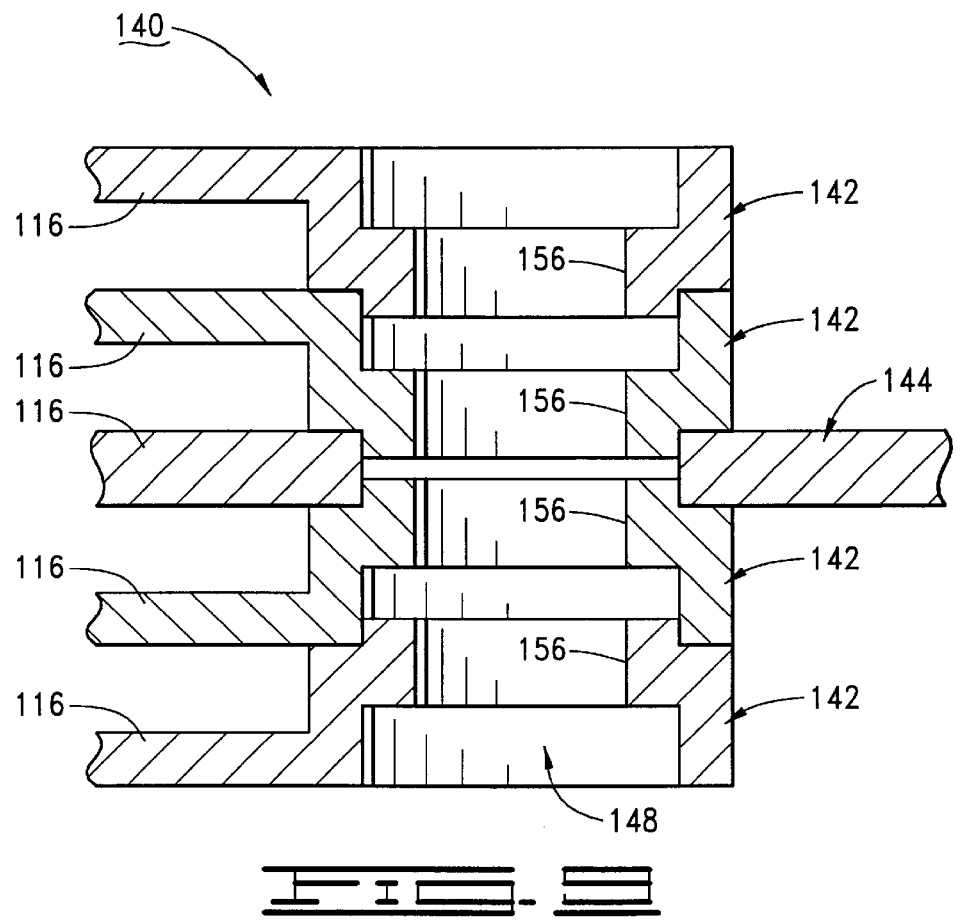
FIG. 9 provides yet another E-block embodiment, showing stackable actuator arm members in conjunction with a central motor support member.

While the embodiments of FIGS. 3–8 contemplate a three-arm, two-disc configuration, these embodiments can be readily modified to support a two-arm, one-disc configuration simply by eliminating one of the actuator arm members 142. FIG. 9 provides yet another preferred embodiment wherein the actuator arm members 142 are formed to be stackable to accommodate any number of discs 106 and actuator arms 116, in this case a five-arm, four-disc arrangement. Although the actuator arm members 142 are shown to include appropriate dimensioned swage bosses 156, other attachment methodologies such as the aforementioned welding techniques can be utilized (with or without the incorporation of the swage bosses 156).

Figure 10:
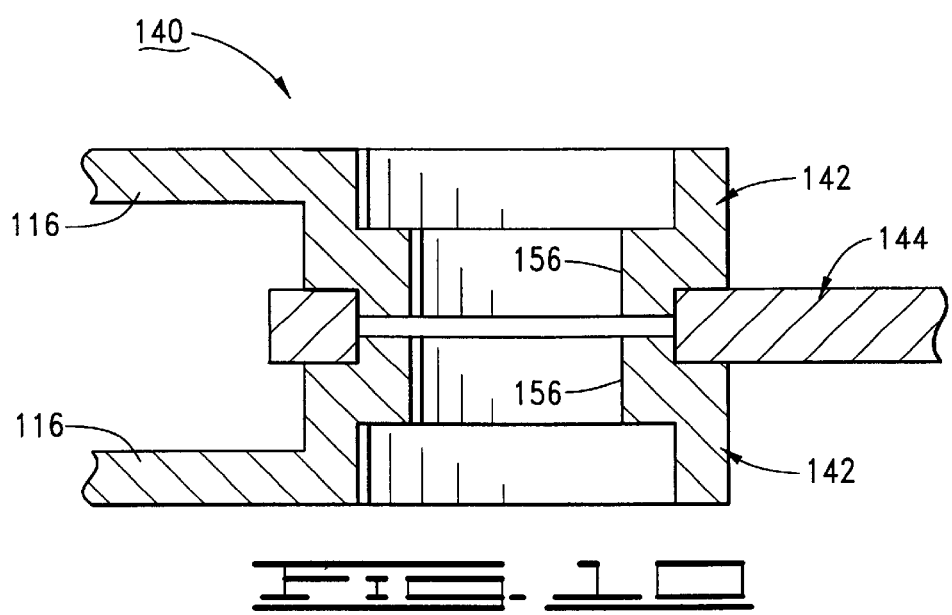
FIG. 10 illustrates another E-block embodiment having a central motor support member without an actuator arm, suitable for a one-disc, two-arm configuration.

FIG. 10 illustrates yet another preferred embodiment for a two-arm, one-disc arrangement for the E-block 140, generally similar to the embodiments previously described hereinabove except that the motor support member 144 is not provisioned with an actuator arm 116. An advantage of the configuration of FIG. 10 is improved axial and radial mass balancing about the pivot axis.

FIGS. 11–13 provide yet another preferred embodiment of the E-block 140 in which a number of radially disposed swage connections are formed about the pivot bearing assembly aperture 148 to attach the motor support member 144 (FIG. 11) and the actuator arm members 142 (FIG. 12). Particularly, swage apertures (one of which is denoted at 158 in FIG. 11) are provided through the motor support member 144 to accommodate corresponding swage bosses (one of which is denoted at 160 in FIG. 12). Although not shown, alternatively the swage apertures 158 can be omitted from the motor support member 144 and the swage bosses 158 can be individually welded to the respective surfaces of the motor support member 144 to form a series of standoffs to achieve the desired axial separation distance.

Figure 14:
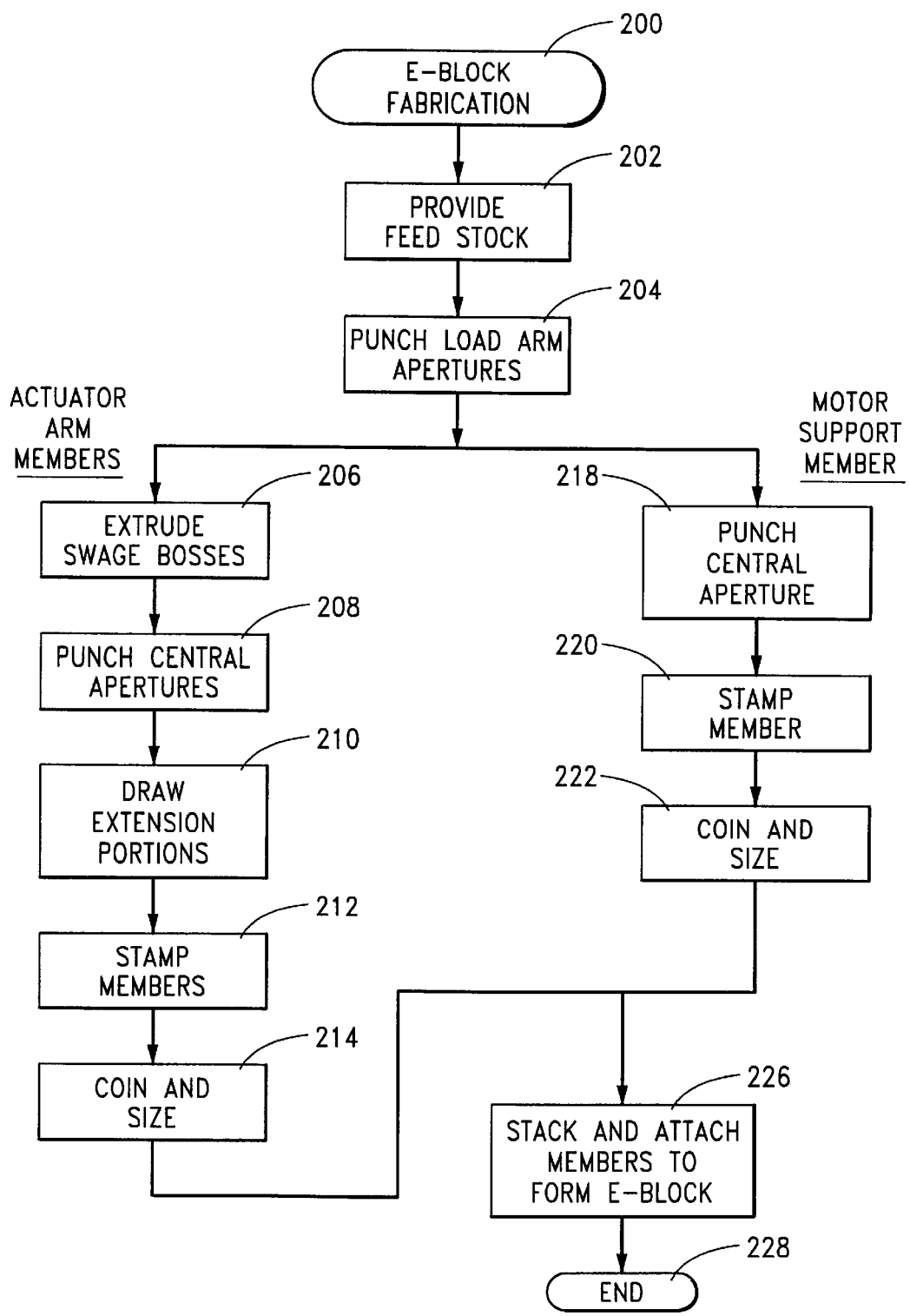
FIG. 14 is a flow chart for an E-BLOCK FABRICATION routine, generally illustrative of steps preferably carried out in accordance with preferred embodiments to fabricate the various E-block configurations shown in FIGS. 3–13.

Having now reviewed a number of preferred configurations for the E-block 140, preferred methodologies for forming the E-block in accordance therewith will now be discussed with reference to FIG. 14 which shows an E-BLOCK FABRICATION routine 200. It will be understood that the steps of the routine of FIG. 14 are preferably carried out in an automated, high volume production environment in which a population of nominally identical E-blocks 140 are fabricated in a fast and efficient manner.

The particular ratio of actuator arm members 142 to motor support members 144 for each E-block 140 will vary depending upon the desired E-block configuration, but in most cases it is generally contemplated that each finished E-block will have one motor support member 144 and multiple (typically two) actuator arm members 142. For purposes of efficiency, multiple sets of actuator arm members 142 and motor support members 144 can be fabricated at the same time in the desired ratios so that multiple E-blocks 140 are formed generally at the same time. Those skilled in the art can readily adapt commercially available progressive die metalworking machinery to take into account these and other considerations in carrying out the indicated steps.

For the sake of clarity, the following discussion will contemplate the formation of a single E-block 140 in accordance with the configuration of FIG. 7 having two actuator arm members 142 and one motor support member 144, and using a swage interconnection to interconnect these members.

At step 202, feed stock is initiallly provided as raw material from which the various elements of the E-block 140 are formed. The feed stock preferably comprises any suitable material, such as coiled aluminum, which is advanced and presented along a planar orientation with a thickness generally corresponding to the final thickness of the actuator arms 116 and coil support arms 126. At step 204, a punch operation is performed to punch the load arm apertures 136 at appropriate locations (see FIGS. 4–5).

Because the actuator arm members 142 and the motor support member 144 are fabricated separately and concurrently, at this point the flow of FIG. 14 divides into two respective paths for these different members. To form the actuator arm members 142, the routine continues to step 206 wherein portions of the feed stock are extruded to form the swage bosses 156. The central apertures through the swage bosses 156 are punched at step 208.

At step 210, a progressive die process is preferably employed to draw the extension portions 146 (see FIGS. 4–5) to the desired shape and depth, so that the extension portions are integral to and extend from the planar actuator arm portions. The members are individually stamped (blanked, cut) from the feed stock at step 212. It will be noted that, should swage bosses 156 not be desired (such as shown for the configuration of FIG. 6), step 206 is unnecessary and therefore omitted, and the punching of the central aperture at step 208 may be performed after the extension portions are drawn at step 210.

A suitable coining and sizing operation is next carried out on the separated, stamped members at step 214 to establish critical dimensions for various surfaces of the members. As will be recognized, a coining operation involves the application of a suitable high pressure to cause material to flow to a desired final configuration. Preferably, the surfaces that abuttingly contact the motor support member 144 (Such as surface 216 generally referenced in FIG. 4) and the load arm support surfaces 136 (also shown in FIG. 4) are coined within precise intersurface tolerances. It will be noted that this ensures correct operation of the actuator 110 irrespective of any small variations that may exist along the actuator arms 116.

Once the desired surfaces are coined, the members are sized by the application of a high energy impact along the lengths of the members to relieve stress in order to ensure the members retain the desired configuration during the life of the E-block 140.

Concurrently, the motor support member 144 is formed by punching the central aperture at step 218, followed by a stamping operation at step 220 to cut the member from the feed stock and a coining and sizing operation at step 222 to establish critical dimensions of various surfaces, such as the load arm support surfaces 134 (FIG. 4) and an actuator arm member attachment surface 224 (FIG. 4). It will be noted that step 218 is unnecessary and therefore omitted when the desired E-block configuration corresponds to the two-arm configuration set forth by FIG. 10.

Finally, the completed actuator arm members 142 and the motor support member 144 are stacked and attached using the desired attachment methodology (in this case, swaging) to form the completed E-block at step 226, after which the process ends at step 228.

Accordingly, one aspect of the present invention is directed to a method for forming an E-block 140 for a data handling system by performing steps of providing feed stock of a suitable material, such as aluminum along a planar orientation (step 202); drawing a portion of the feed stock out of plane to form an extension portion (step 210); and stamping the feed stock (step 212) to separate an actuator arm member 142 having a substantially planar actuator arm 116 from which the extension portion extends, the actuator arm configured to support the read/write head. The actuator arm member is then affixed to a second member (such as a motor support member 144 or another actuator arm member 142) using a suitable process, such as swaging or welding (step 226).

In a related aspect, the second member is a motor support member 144 having a coil support arm 126 configured to support an actuator coil 113 of an actuator motor 114 and stamped from the feed stock (step 220). In another aspect, the motor support member includes an actuator arm 116 configured to support a second read/write head 120, so that the extension portion nominally establishes the distance between the respective actuator arms. In another aspect, the E-block further includes a second actuator arm member 142 nominally identical to the first actuator arm member preferably formed using the above steps. In another aspect, the first and second actuator arm members 142 are affixed to opposing sides of the motor support member 144.

In another aspect of the present invention, an E-block 140 for an actuator 110 of a data handling system such as a disc drive 100 comprises a substantially planar motor support member 144 comprising a coil support arm 126 configured to support a coil 113 of an actuator motor 114 used to rotate the actuator. The E-block further comprises an actuator arm member 142 comprising a substantially planar actuator arm 116 configured to support a read/write head 120 and an extension portion 146 formed by drawing material from the actuator arm a selected axial separation distance from the actuator arm 116. The actuator arm member 142 is affixed to the motor support arm member 144 to form the E-block.

In a related aspect, the actuator arm member 142 is characterized as a first actuator arm member comprising a first actuator arm and a first extension portion, and wherein the E-block further comprises a second actuator arm member 142 nominally identical to the first actuator arm member comprising a substantially planar second actuator arm 116 configured to support a second read/write head 120 and a second extension portion 146 formed by drawing material from the second actuator arm a second selected axial separation distance from the second actuator arm. The first and second actuator arm members 142 are affixed to opposing sides of the motor support member 144 (as shown in FIG. 5), or the first actuator arm member 142 is affixed to the second actuator arm member 142 (as shown in FIG. 9).

In yet another aspect of the present invention, a data handling system 100 comprises a rotatable disc 106 having a recording surface and an actuator 110 which rotatably supports a read/write head 120 adjacent the recording surface. The actuator comprises an E-block 140 formed by a process comprising steps of providing feed stock along a substantially planar orientation (step 202); drawing a portion of the feed stock out of plane to form an extension portion (step 210); stamping the feed stock (212) to separate an actuator arm member having a substantially planar actuator arm from which the extension portion extends; and affixing the extension portion of the actuator arm member to a substantially planar second member to form the E-block (step 226), wherein the extension portion establishes an axial separation distance between the planar actuator arm and the second member.

In a related aspect, the second member comprises a motor support member 144, and the E-block is further formed by a process comprising steps of stamping the feed stock (step 220) to separate the motor support member from the feed stock, the motor support member having a coil support arm 126 configured to support a coil of an actuator motor used to rotate the actuator. In another related aspect, the stamped motor support member further comprises an actuator arm configured to support at least one additional read/write head.

For purposes of the appended claims, the term "E-block" will be clearly understood consistent with the foregoing discussion to describe the mechanically rigid portions of an actuator such as exemplified by FIGS. 3–5 and used to support at least one read/write head adjacent a corresponding number of recording surfaces. While method claims are provided below with alphameric step designations. such are merely for purposes of convenience so that the claims are not necessarily limited to the order shown. While presently preferred embodiments have been presented in the environment of a disc drive, it will be readily understood that the present invention can be advantageously used in other types of data handling systems, such as optical and magneto/optical data storage systems.

It is clear that the present invention is well adapted to attain the ends and advantages mentioned as well as those inherent therein. While presently preferred embodiments of the invention have been described for purposes of the disclosure, it will be understood that numerous changes can be made which will readily suggest themselves to those skilled in the art. Such changes are encompassed within the spirit of the invention disclosed and as defined in the appended claims.

What is claimed is:

1. An E-block for use in a data handling system to support a read/write head adjacent a recording surface, comprising:
    a substantially planar motor support member comprising a coil support arm configured to support a coil of a motor used to rotate the E-block; and
    an actuator arm member comprising a substantially planar actuator arm configured to support the read/write head and an extension portion formed by drawing material from the actuator arm a selected axial separation distance, wherein the actuator arm member is affixed to the motor support member.

2. The E-block of claim 1, wherein the actuator arm member is characterized as a first actuator arm member comprising a first actuator arm and a first extension portion, and wherein the E-block further comprises:
    a second actuator arm member nominally identical to the first actuator arm member comprising a substantially planar second actuator arm configured to support a second read/write head and a second extension portion formed by drawing material from the second actuator arm a second selected axial separation distance from the second actuator arm, wherein the first and second actuator arm members are affixed to opposing sides of the motor support member.

3. The E-block of claim 2, wherein the planar motor support member further comprises a third actuator arm nominally identical to the first and second actuator arms configured to support at least a third read/write head, wherein the first axial separation distance nominally establishes a distance between the first and third actuator arms and wherein the second axial separation distance nominally establishes a distance between the second and third actuator arms.

4. The E-block of claim 1, wherein the actuator arm member is characterized as a first actuator arm member comprising a first actuator arm and a first extension portion, and wherein the E-block further comprises:
    a second actuator arm member nominally identical to the first actuator arm member comprising a substantially planar second actuator arm configured to support a second read/write head and a second extension portion formed by drawing material from the second actuator arm a second selected axial separation distance from the second actuator arm, wherein the second actuator arm member is affixed to the first actuator arm member so that the first actuator arm member is disposed between the second actuator arm member and the motor support member.

5. The E-block of claim 1, wherein the actuator arm member is secured to the motor support member using a swage connection.

6. The E-block of claim 1, wherein the actuator arm member is welded to the motor support member.

7. A data handling system, comprising:
    a rotatable disc having a recording surface; and
    an actuator which rotatably supports a read/write head adjacent the recording surface, comprising an E-block formed by a process comprising steps of:
    (a) providing feed stock along a substantially planar orientation;
    (b) drawing a portion of the feed stock out of plane to form an extension portion;
    (c) stamping the feed stock to separate an actuator arm member having a substantially planar actuator arm from which the extension portion extends, the actuator arm configured to support the read/write head; and
    (d) affixing the extension portion of the actuator arm member to a substantially planar second member to form the E-block, wherein the extension portion establishes an axial separation distance between the planar actuator arm and the second member.

8. The data handling system of claim 7, in which the second member comprises a motor support member, and in which the E-block is further formed by a process comprising a step of stamping the feed stock to separate the motor support member from the feed stock, the motor support member having a coil support arm configured to support a coil of an actuator motor used to rotate the actuator.

9. The data handling system of claim 8, in which the stamping step (c) further comprises a step of providing the motor support member with an actuator arm configured to support a second read/write head adjacent a second recording surface, so that the axial separation distance established by the extension portion comprises an axial distance between the actuator arm of the actuator arm member and the actuator arm of the motor support member sufficient to accommodate the disc.

10. A data handling system comprising:
    a rotatable disc having a recording surface; and
    an actuator which rotatably supports a read/write head adjacent the recording surface comprising an E-block formed by steps for forming an E-block.

11. A method for forming an E-block configured to support a read/write head adjacent a recording surface, comprising steps of:
    (a) providing feed stock along a substantially planar orientation;

(b) drawing a portion of the feed stock out of plane to form an extension portion;

(c) stamping the feed stock to separate an actuator arm member having a substantially planar actuator arm from which the extension portion extends, the actuator arm configured to support the read/write head; and (d) affixing the extension portion of the actuator arm member to a second member to form the E-block, wherein the extension portion establishes an axial separation distance between the planar actuator arm and the second member.

12. The method of claim 11, in which the second member comprises a substantially planar motor support member, and in which the method further comprises a step of:

(e) stamping the feedstock to separate the motor support member from the feed stock, the motor support member having a coil support arm configured to support a coil of an actuator motor used to rotate the actuator.

13. The method of claim 12, in which the stamping step (e) further comprises a step of providing the motor support member with an actuator arm configured to support a second read/write head adjacent a second recording surface, so that the axial separation distance established by the extension portion comprises an axial distance between the actuator arm of the actuator arm member and the actuator arm of the motor support member.

14. The method of claim 12, in which the actuator arm member is characterized as a first actuator arm member having a first actuator arm and a first extension portion, and in which the method further comprises steps of:

(f) repeating steps (b) and (c) to provide a second actuator arm member nominally identical to the first actuator arm member and having a second actuator arm and a second extension portion; and (g) affixing the second extension portion to the motor support member opposite the first extension portion so that the motor support member is disposed between the first and second actuator arm members.

15. The method of claim 1, in which the affixing step (d) comprises establishing a swage connection between the actuator arm member and the second member.

16. The method of claim 1, in which the affixing step (d) comprises welding the actuator arm member to the second member.

17. The method of claim 11, in which the feed stock of the providing step (a) comprises a sheet of aluminum having a thickness that nominally corresponds to a thickness of the actuator arm.

18. The method of claim 11, further comprising a step of:

(e) coining the actuator arm member by applying pressure to cause at least a portion of the actuator arm member to flow to a desired final shape.

19. The method of claim 18, in which the coining step (e) comprises steps of applying pressure to the extension portion to establish a desired dimension of the extension portion to achieve the axial separation distance, and applying pressure to a distal end of the actuator arm to establish a load arm surface with a desired dimension relative to the desired dimension of the extension portion.

* * * * *